United States Patent

[11] 3,599,334

| [72] | Inventor | Fuller Warden<br>Tulsa, Okla. |
|---|---|---|
| [21] | Appl. No. | 851,253 |
| [22] | Filed | Aug. 19, 1969 |
| [45] | Patented | Aug. 17, 1971 |
| [73] | Assignee | Grace Development Company |

[54] CURVED INTRA-ORAL VISUAL PARALLELER
1 Claim, 7 Drawing Figs.

| [52] | U.S. Cl. | 32/67, 32/69 |
|---|---|---|
| [51] | Int. Cl. | A61c 3/00 |
| [50] | Field of Search | 32/69, 40, 67, 12 |

[56] References Cited
UNITED STATES PATENTS

| 1,509,041 | 9/1924 | Hyams | 32/69 |
| 3,468,030 | 9/1969 | Peyser et al. | 32/69 |

*Primary Examiner*—Robert Peshock
*Attorney*—William S. Dorman

ABSTRACT: A curved intraoral mirror for providing an accurate visual determining of the degree of parallelism of two or more teeth in the preparation of dental bridgework, and particularly fixed bridgework. The arcuate mirror is carried by a handle member having a lens secured thereto for facilitating viewing of the teeth and providing the optimum positioning for the eye with respect to the reflecting surface for visual accuracy of the parallelism of the teeth.

INVENTOR.
FULLER WARDEN

BY William S. Dorman

ATTORNEY

INVENTOR.
FULLER WARDEN

BY William S. Dorman

ATTORNEY

CURVED INTRA-ORAL VISUAL PARALLELER

The present invention relates to improvements in dental instruments and more particularly, but not by way of limitation, to a novel curved intraoral mirror for improving the accuracy of visually determining the degree of parallelism of two or more teeth during the preparation of dental bridgework.

In the preparation or construction of dental crowns or bridges, the top surface and the vertical surfaces of the teeth are reduced whereby the teeth involved are tapered to a degree that permits the crown to slip over the tooth. When two or more teeth are involved in the operation, such as in bridgework or dental splints, the teeth must not only be tapered individually but tapered in a plane parallel to the other teeth involved in the bridge or splint. This may involve any number of teeth from two to 16. It is important that the teeth be parallel since the bridge or splint is in one piece and the crowns of the splint must all seat at the same time and in the same direction. Each crown must be tapered but it is desirable to maintain the taper as small as possible because the less taper on the crown the more retention it will ultimately have to the tooth. The dentist frequently prepares the teeth for the crown with too much taper in order to be certain that the crown will seat, and as a result there is loss in the needed retention and the bridge may soon loosen and be lost and the lift of the tooth may be lessened.

The preparation of the teeth by the dentist for crowns and bridges must be done in the mouth and the confines of the mouth render it virtually impossible or, at best, very difficult to visually survey or check the progress of the preparation of one tooth as compared to the other teeth involved in the particular operation. The usual procedure in use today normally includes the use of a flat mirror similar to a ladies purse mirror, with the mirror being placed in the mouth at an angle. With the mirror disposed in the mouth, the dentist may look down on the prepared teeth reflected in the mirror to visually ascertain whether or not the prepared teeth appear to be equally tapered and parallel. This procedure has disadvantages in that the mouth usually cannot open wide enough to see both a front tooth and back tooth in the mirror simultaneously. In addition, the reflected image conveys false information to the dentist which often results in poorly prepared dental teeth and the bridgework is often a failure. The inaccuracy of the results is because the dentist assumes the reflected image of the flat surface mirror shows parallelism. The fact is, however, that the two separate teeth seen in a flat surface mirror are viewed at different angles and, therefore, the parallax phenomenon creates a false impression. Not only is the reflected view from the front to the back tooth distorted with respect to parallelism, but the same discrepancy exists in checking teeth from right to left. In relying upon this visual method, the dentist frequently learns by failure in that he overtapers the teeth in his preparations which results in poor retention and lost bridges and damaged or lost teeth.

The present invention contemplates a novel intraoral mirror for facilitating visual determination of parallelism particularly designed and constructed for overcoming the above disadvantages. Upon recognition of the problem, the solution and design of the instrument of the present invention was determined by what must be accomplished. This involves the confines of the human mouth in which the instrument must be used, the optical nature of a mirror and the limitation of the human eye. The resulting engineered curvature of the novel reflecting mirror is a concave paraboloid similar to a segment from the surface of the end of a watermelon. This particularly selected and developed optical surface receives all visual rays from a single eye position and reflects them from any point on its surface in a parallel line. Thus, all positions or points along the reflecting surface are seen in parallel respect to one eye position. The contour or confines of the mouth include the shape of the dental arch, the cheek and opening of the mouth and the space available between the upper and lower arches at maximum opening. This confirmation or confinement determines the outer periphery or contour which may be utilized for the mirror. With regard to the limitation of the human eye, it has been determined or discovered that the eye must be placed approximately 3 to 5 inches from all points on the arcuate reflected surface in order that all portions of the mirrored surface may be viewed and all areas of an upper or lower dental arch be seen at one time in a parallel aspect. Thus, a lens is normally required to bring the surface into focus at the eye position. The lens is also utilized to predetermine the position of the eye of the dentist or user of the instrument. The reflections viewed in the arcuate mirror accurately display the relative parallelism of the teeth thus greatly reducing or substantially eliminating inadvertent or accidental overtapering of the teeth during the preparation thereof for bridgework or the like.

It is an important object of this invention to provide a novel intraoral mirror for permitting accurate visual inspection relating to parallelism of teeth in a patent's mouth.

It is another object of this invention to provide a novel intraoral mirror particularly designed and constructed for efficient use within the confines of the mouth area whereby accurate results of the instrument are not hindered by the internal contour of the mouth.

Another object of this invention is to provide a novel visual paralleler which permits accurate determination of parellelism during the preparation of teeth for dental bridgework and the like.

Still another this invention is to provide a novel visual paralleler for facilitating the preparation of teeth for dental bridgework and the like wherein the position of the eye of the dentist is established at the optimum relationship with respect to the reflecting surface of the paralleler.

It is still another object of this invention to provide a novel intraoral visual paralleler which is simple and efficient in operation and economical and durable in construction.

Other and further objects and advantageous features of the present invention will hereinafter more fully appear in connection with a detailed description of the drawings in which.

Figure 2:
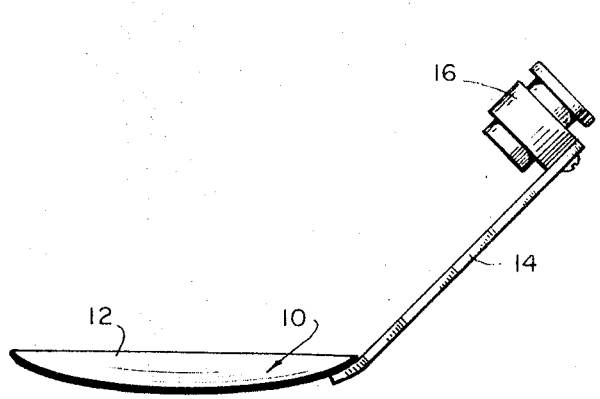
FIG. 2 is a side elevational view of an intraoral visual paralleler embodying the invention.
Figure 3:
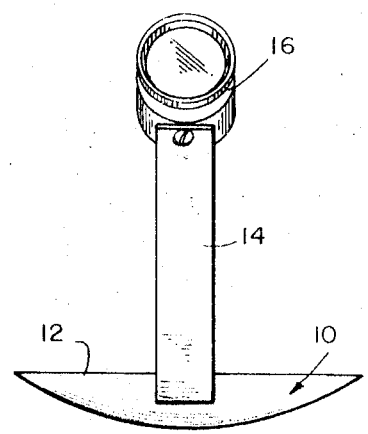
FIG. 3 is a front elevational view of an intraoral visual paralleler embodying the invention.

Referring to the drawings in detail, and particularly FIGS. 1 through 3, reference character 10 generally indicates an intraoral visual paralleler comprising a reflecting body 12 having an outwardly extending handle member 14 secured thereto in any well known manner for facilitating manipulation thereof as will be hereinafter set forth. A suitable lens 16 is secured to the handle 14 and may be adjustable therealong whereby the distance between the lens 16 and reflecting body 12 may be selected in accordance with the optimum spacing therebetween for visual scanning of the reflecting surface by an eye. The body 12 is of an arcuate configuration comprising a concave curve in both the longitudinal and transverse directions, said arcuate configuration being substantially a paraboloid generally corresponding to a segment from the surface of the end of a watermelon, or the like.

The spacing between the body 12 and the lens 16 is preferably approximately 3 to 5 inches, which is found to be the optimum spacing for permitting visual scanning of the entire surface of the body 12 without visual interference from the teeth and lips of the mouth. The lens 16 may be of any suitable type for bringing reflections from the body 12 into focus during utilization of the apparatus 10.

Figure 1:
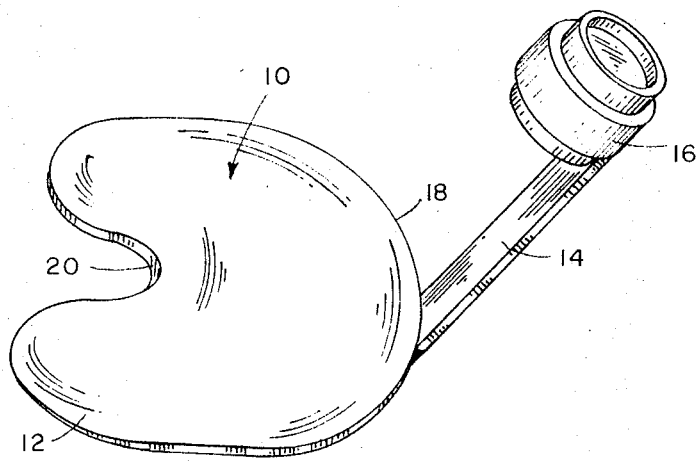
FIG. 1 is a perspective view of an intraoral visual paralleler embodying the invention.
Figure 4:
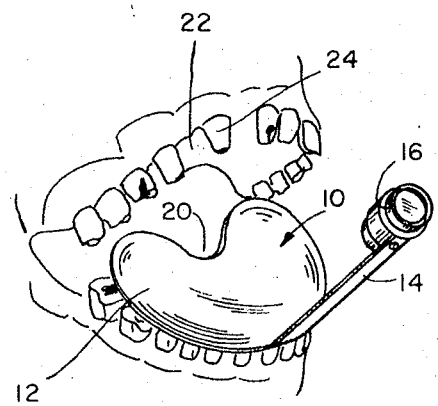
FIG. 4 is a perspective view showing an intraoral visual paralleler embodying the invention disposed within a mouth cavity.

The outer periphery of the body 12 is generally rounded or curved throughout the greater portion 18 thereof, as particularly shown in FIGS. 1 and 4. The remaining portion of the outer periphery thereof is provided with an arcuate recess 20 for facilitating disposition of the body 12 within the mouth 22 during viewing of the teeth.

Figure 6:
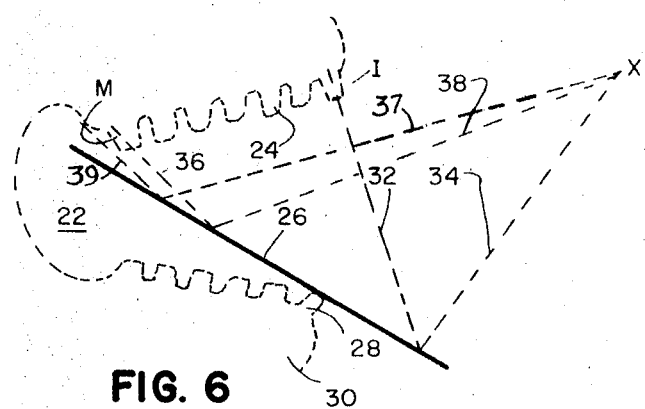
FIG. 6 is a schematic view of the interior of a mouth and the conventional flat reflecting surface as in use today in the visual determination of parallelism for the teeth.

As shown in FIG. 6, the mouth 22 is shown wherein the teeth 24 and 28 have been prepared for receiving a bridge or crown. The usual flat reflecting surface normally utilized today in visual parallelizing of teeth by the dental profession is indicated by the straight line 26. In order to place the flat reflecting surface 26 within the mouth 22 at the proper angle for viewing of the upper teeth 24, the front lower teeth 28 interfere with the device, even when the lower jaw 30 is wide open. It is thus very difficult or substantially impossible to position the flat surface 26 at the optimum angle for viewing of the teeth 24. In addition, two separate objects seen or viewed in a flat surface mirror or reflective surface are viewed at different angles and therefore the parallax phenomenon creates a false impression. For example, in FIG. 6 the front upper tooth is indicated at I, the upper back tooth is indicated at M, and the position of the viewing eye is indicated at X. The dotted lines 32 and 34 show the approximate line of vision in seeing the prepared tooth I in the reflecting surface of mirror 26. The lines 36 and 38 indicate the approximate line of vision in seeing the prepared tooth M. To properly check the parallelism of both teeth I and M the image of each tooth should be seen at a point on the mirror directly below the long axis of the respective tooth. This is seen with respect to the tooth I, but not with respect to the tooth M. The dotted lines 37 and 39 illustrate the approximate lines of vision of an actual parallel relationship between the teeth I and M. It will be apparent that the viewing line 39 completely misses the tooth M. The angle of vision of the tooth I is greatly different from the angle of actual vision of the tooth M, and the dentist is led to believe or assumes that he must cut off more of the tooth M than is actually necessary, thus creating too much taper for satisfactory retention of the bridge. This error is shown in only one plane in FIG. 6, namely the longitudinally extending plane, but the error is equally erroneous in a plane perpendicular to that shown in the drawings.

Figure 7:
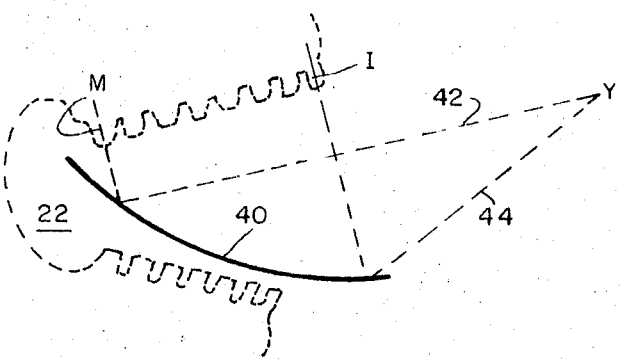
FIG. 7 is a view similar to FIG. 6 depicting the arcuate visual paralleler of the present invention.

Referring now to FIG. 7, the reflecting body 12 is indicated generally or schematically by the curved line 40 within the mouth 22. It will be readily apparent that the curvature of the line 40 prevents interference from the lower teeth 28 during placing of the body 12 within the mouth 22. The optimum position for the eye is indicated at Y in FIG. 7, and the curvature of the reflective surface 40 compensates for the different positions on the surface 40 at which the objects are seen, and all the prepared teeth are seen on the surface 40 at a point below the long axis thereof. To see the reflections of the back tooth M, the line of vision must be in a plane passing below the front teeth I to a point on the mirror below the back tooth M. As shown in FIG. 7, this line of vision is indicated by the dotted line 42. To see the reflection of the front tooth I it must also be seen in a parallel aspect at a point below the long axis thereof, and therefor must be looked down upon sufficiently to reflect back at the proper angle. This is indicated by the line 44. Of course, Y represents the point at which the two planes of vision indicated by the lines 42 and 44 intersect, and this is the optimum point at which the eye must be placed to view all reflected images in a parallel aspect. As hereinbefore set forth, this point is only approximately 3 to 5 inches from all points on the reflecting surface 40, it is desirable to provide the lens 16 for bringing the reflected images into focus at the eye.

Figure 5:
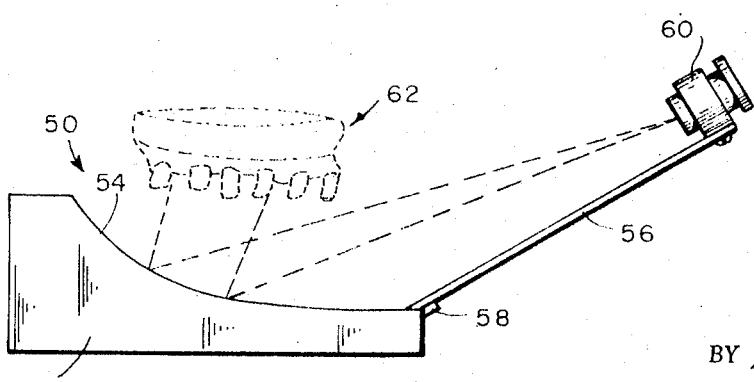
FIG. 5 is a side elevational view of a modified intraoral visual paralleler embodying the invention.

Whereas the device 10 relates to use by dentists as they prepare teeth in the mouth for dental crowns and bridgework, and the like, the modification shown in FIG. 5 relates to a similar device for use by dental laboratory technicians in the preparation or fabrication of crown and bridgework on duplicate models of the mouth. The laboratory technician is not required to confine the work to the interior of the mouth, and and a result these limitations are not necessary for the optic instrument. Accordingly, the modified parallel visualizer generally indicated at 50 comprises a base or stand portion 52 which may be constructed from any suitable material, such as plaster, stone, or the like, but not limited thereto, whereby the device 50 may be disposed on a plane surface such as a table, or the like, during utilization thereof. A reflective body 54 generally similar to the body 12 but preferably of a larger area size, may be secured to the base 52 in any suitable manner, such as by cementing, or the like, and a handle member 56 similar to the handle 14 may be provided for the device 50. The handle member 56 may be adjustably or hingedly secured at 58 to the base 52 for facilitating adjustment of the angular disposition of the handle 56 with respect to the reflecting surface 54, if desired. Whereas a lens 60 may be provided for the handle 56, it is to be understood that the lens may be eliminated from this modification. However, it is considered desirable to at least provide an eye loop or eye guide (not shown) or the like for facilitating the indication of the positioning of the eye during use of the device 50.

The dental model generally indicated at 62 such as normally utilized by the dental laboratory technician in this type of operation is usually portable, and may be moved or adjusted by hand with relation to the reflective surface 54 whereby the teeth of the model 62 may be viewed as hereinbefore set forth for a visual determination of parallelism.

It is to be understood that whereas the embodiments shown herein provide a reflective surface for viewing of all the teeth simultaneously, or with a single reflective surface, it is anticipated that smaller mirrors or reflecting surfaces may be provided for the device for the viewing of a relatively small number of teeth for the construction or fabrication of shorter span bridges, and the like. Of course, the curvature of the reflecting surface will be generally as set forth herein to assure an accurate image for the dentists to convey accurate and nondeceiving information for the preparation of the teeth. It is further anticipated that a light (not shown) may be provided in conjunction with the lens 16 or on the handle 14 for facilitating viewing of the interior of the mouth. In addition, the lens 16 depicted herein comprises a lens member inserted within a loop or holder member, and it is anticipated that a single lens may be secured directly to the handle 14, if desired, thus providing less interference for the eye during use of the device 10.

From the foregoing it will be apparent that the present invention provides a novel visual paralleler having an arcuate reflecting surface particularly designed and constructed for reflecting tooth images in a manner to present a true representation of the parallelism thereof to a technician or dentist. The reflecting surface is of a configuration complementary to the confines of the mouth in order to facilitate utilization thereof by a dentist and is provided with an eye guide or lens for assuring an optimum positioning of the eye with respect to the reflecting surface for achieving accurate parallelizing results. The novel visual parallelizer is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What I claim is:

1. A dental instrument for visual determination of parallelism of teeth comprising transversely and longitudinally arcuate reflecting means for disposition within the mouth in the proximity of the teeth, handle means carried by the reflecting means for facilitating manipulation thereof, said reflecting means providing a reflected simultaneous image of the complete upper or lower set of teeth representing true parallelism of the teeth, eye guide means carried by the handle for facilitating comparative viewing of the tooth images reflected from the reflective means, said reflective means comprising a mirror wherein the outer periphery thereof generally corresponds with the size and configuration of the internal transverse confines of the mouth for facilitating disposition thereof within the mouth, said mirror having a cross-sectional configuration generally corresponding to a paraboloid whereby said simultaneous tooth images are reflected to the foci of the paraboloid for providing a true visual representation of parallelism of the teeth.